Figure 1:
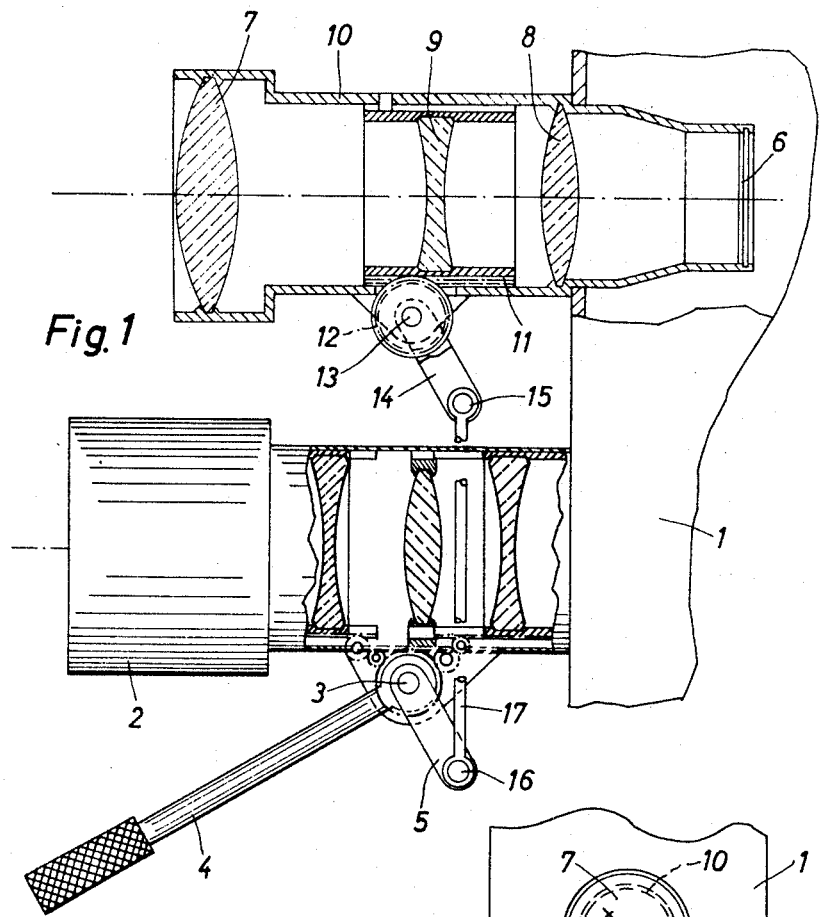

May 25, 1965 H. R. BARON 3,185,052
STRUCTURE FOR CONTROLLING THE LIGHT WHICH REACHES
A PHOTOSENSITIVE ELEMENT OF A CAMERA
Filed Nov. 29, 1961

INVENTOR.
HANS RUDOLF BARON
BY
Michael S. Striker

_United States Patent Office_ 3,185,052
Patented May 25, 1965

3,185,052
STRUCTURE FOR CONTROLLING THE LIGHT WHICH REACHES A PHOTOSENSITIVE ELEMENT OF A CAMERA
Hans Rudolf Baron, Munich, Germany, assignor to Agfa Aktiengesellschaft, Leverkusen-Bayerwerk, Germany
Filed Nov. 29, 1961, Ser. No. 155,698
Claims priority, application Germany, Dec. 15, 1960, A 16,027
6 Claims. (Cl. 95—10)

The present invention relates to cameras either of the still or of the motion-picture type.

Certain well known cameras are provided with objectives whose focal lengths are adjustable, such objectives being popularly referred to as zoom lenses. Where a camera which has such an objective of adjustable focal length is also provided with a light-measuring structure, certain inaccuracies will result unless the angle from which light reaches the photosensitive element of the light-measuring structure is adjusted so as to be equal to the angle of the adjusted objective. For example, if the objective is adjusted so as to provide a relatively long focal length, the viewing angle thereof will of course be relatively narrow, and unless some structure is provided for adjusting the viewing angle from which light reaches the photosensitive element of the light measuring structure, this latter viewing angle may be so much greater than that of the camera objective that a completely false light measurement will be provided. Although this problem has already been recognized, the solutions heretofore provided are not satisfactory particularly with respect to the extremely poor accuracy of heretofore known solutions to this problem.

It is therefore a primary object of the present invention to provide for cameras of the above type a construction which will guarantee that the angle from which light reaches the photosensitive element of the light-measuring structure will equal the angle of the adjusted camera objective.

Another object of the present invention is to provide a construction wherein the adjustment of the viewing angle from which light reaches the photosensitive element takes place in a fully automatic manner upon adjustment of the focal length of the camera objective.

It is furthermore an object of the present invention to provide a structure of the above type which will operate with an extremely high degree of accuracy so as to guarantee proper light measurement.

An additional object of the present invention is to provide a structure of the above type which will uniformly distribute the light over the photosensitive element of the light-measuring structure.

With these objects in view, the invention includes, in a camera, a camera objective capable of having its focal length adjusted and a photosensitive element forming part of a light-measuring structure. A second objective which is capable of having its focal length adjusted is located in front of the photosensitive element, and a pair of adjusting means respectively cooperate with the objectives for adjusting the focal lengths thereof. In accordance with the present invention a coupling means couples the pair of adjusting means to each other for automatically providing the second objective with a focal length corresponding to that of the camera objective so that the viewing angle of the second objective equals that of the camera objective and thus the light which reaches the photosensitive element through the second objective will provide an accurate energizing of the photosensitive element.

Figure 2:
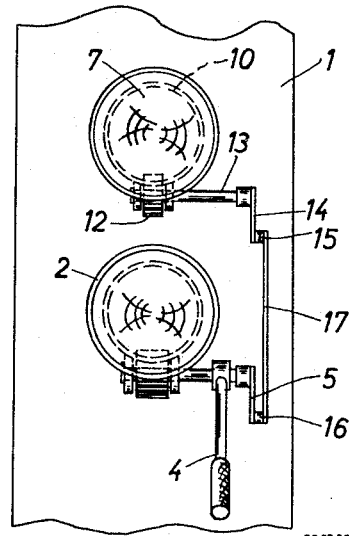

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

There is FIGURE 1 in the drawing wherein the structure of the invention is illustrated in a partly sectional view according to one possible embodiment. FIGURE 2 shows a smaller view of the frontside of the structure of FIGURE 1.

Referring now to the drawing there is fragmentarily illustrated therein a camera housing 1 which carries a camera objective 2 which in a well known manner is capable of having its focal length adjusted. The structure for adjusting the focal length of the objective 2 is well known and the adjusting means for adjusting the focal length of the objective 2 includes the manually turnable lever 4 fixed to a shaft 3 which is supported for rotary movement about its axis and which in a well known manner actuates the remaining structure of the adjusting means for regulating the focal length of the objective 2.

The camera includes a light-measuring structure, and this light-measuring structure in a well known way includes a photosensitive element 6 which may take the form of a photocell or of an electrical resistor whose resistance varies with changes in the amount of light which impinges on the resistor. Located in front of the photosensitive element 6 is a second objective 10 whose focal length is capable of being adjusted, and this second objective 10 includes a pair of positive lenses 7 and 8 and a negative lens 9 located therebetween. A second adjusting means is provided to adjust the focal length of this second objective which is located in front of the photosensitive element 6, and of course the viewing angle of this second objective should equal at all times the viewing angle of the camera objective 2 so that the light-measuring structure will be able to operate accurately. The adjusting means for adjusting the second objective 10 includes a rack 11 fixed to and extending along the tube which houses the negative lens 9, and a rotary pinion 12 meshes with the rack 11, this rotary pinion 12 being supported by a shaft 13 for rotary movement, and the shaft 13 itself is located on a suitable bracket. The pinion 12 of course extends through a suitable slot in the outer wall of the objective 10 into mesh with the rack 11. Upon rotation of the pinion 12 the negative lens 9 will be moved along the optical axis of the objective 10 and thus the focal length and viewing angle thereof will be changed.

In accordance with the present invention a coupling means is provided for coupling the adjusting means of the camera objective 2 to the adjusting means of the second objective 10, so that this latter objective will be automatically adjusted in response to adjustment of the focal length of the camera objective 2, and the adjustment is of course made in such a way that the viewing angles of the pair of objectives are equal at all times. This coupling means includes in the illustrated example a parallelogram linkage which includes a pair of cranks 5 and 14 respectively fixed to the rotary elements 4 and 12 for rotary movement therewith. These cranks 5 and 14 of the parallelogram linkage turn respectively about the same axes that the rotary elements 4 and 12 turn about. It will be noted that in the illustrated example the crank 5 is fixed to the rotary element 4 at an angle of approximately 90° with respect to the rotary element 4. The coupling means or the parallelogram linkage includes in addition to the cranks 5 and 14 an elongated connecting rod 17 pivotally connected at one end to a rod 15 which is fixed to and extends from the crank 14 in a direction parallel to the shaft 13 and at its opposite end to a rod 16 which is fixed to the crank 5 and extends therefrom in a direction parallel to the shaft 3.

Thus, with this construction whenever the operator turns the lever 4 of the adjusting means of the camera objective 2 for changing the focal length thereof, the parallelogram linkage or coupling means will automatically produce simultaneous turning of the pinion 12 and movement of the lens 9 along the optical axis so as to provide at the second objective 10 a viewing angle which at all times is in correspondence with the viewing angle of the camera objective 2.

In the illustrated example cranks 5 and 14 are of the same length. If the transmission ratios of the pair of adjusting means which respectively change the focal lengths of the objectives 2 and 10 are the same, then when the focal lengths are changed the movable lenses will be moved with this construction through the same distances. Such construction is required of course when the objectives 2 and 10 have the same construction. However, in the case where the optical systems of the pair of objectives are differently constructed so that the movement of the lenses thereof during a change in their focal lengths is required to take place through different distances, then either the transmission ratios of the pair of adjusting means will have to be different or it is possible to compensate for this difference simply by providing cranks 5 and 14 which have different lengths.

In order to simplify the structure of the second objective 10 and render it less expensive, since this objective is not required to provide an image of a subject but is only required to direct light to the photosensitive element 6, the lenses of the objective 10 may be made of any suitable plastic material, and the face of the lens 8 which is directed toward the photosensitive element 6 is preferably of a light-diffusing nature so that the light will be uniformly distributed over the photosensitve element 6, and inasmuch as production of an image is not required by the objective 10, the surface of the lens 8 which is directed toward the photosensitive element 6 can be made of a light-diffusing construction so as to provide better measurements with the light-measuring structure. For this purpose the lens 8 which is nearest to the photosensitive element 6 may be provided at its face which is directed toward the photosensitive element 6 with a matted construction, with any suitable pattern of grooves or the like, or with the structure of a Fresnel lens.

Of course, the invention is not necessarily limited to the details described above. For example, the coupling means between the pair of adjusting means may take the form of a cable and pulley drive or of a simple gear train. Also, it is possible to operate the parallelogram linkage 5, 17, 14 from a pair of rings which respectively turn about the optical axes of the pair of objectives, these rings adjusting the focal lengths of the objectives through suitable worm drives. Finally, in accordance with whether or not the objective 2 and the objective 10 are interchangeable, the coupling means which couples the pair of adjusting means can be arranged either inside or outside of the camera housing and can be arranged also so as to be removable, if desired.

It will be understood that each of the elements described above, or two or more together, may also find a useful application in other types of cameras differing from the types described above.

While the invention has been illustrated and described as embodied in cameras with light meters, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, a camera objective capable of having its focal length adjusted; a photosensitive element forming part of a light-measuring structure; a second objective capable of having its focal length adjusted and located in front of said photosensitive element so that the light reaches the latter through said second objective; a pair of adjusting means respectively connected operatively to said objectives for adjusting the focal lengths thereof; and coupling means coupling said pair of adjusting means to each other for simultaneous operation so that said second objective will be adjusted simultaneously with the camera objective, said pair of adjusting means and coupling means cooperating to automatically direct light through said second objective to said photosensitive element from a viewing angle which is identical with the viewing angle of the camera objective, said pair of adjusting means respectively including a pair of movable elements and said coupling means including a linkage system having a pair of links respectively fixed to said pair of movable elements for movement thereof.

2. In a camera, in combination, a camera objective capable of having its focal length adjusted; a photosensitive element forming part of a light-measuring structure; a second objective capable of having its focal length adjusted and located in front of said photosensitive element so that the light reaches the latter through said second objective; a pair of adjusting means respectively connected operatively to said objectives for adjusting the focal lengths thereof; and coupling means coupling said pair of adjusting means to each other for simultaneous operation so that said second objective will be adjusted simultaneously with the camera objective, said pair of adjusting means and coupling means cooperating to automatically direct light through said second objective to said photosensitive element from a viewing angle which is identical with the viewing angle of the camera objective, said pair of adjusting means respectively including a pair of rotary elements and said coupling means including a parallelogram linkage having a pair of cranks respectively fixed to said pair of rotary elements for rotary movement therewith.

3. In a camera, in combination, a camera objective capable of having its focal length adjusted; a photosensitive element forming part of a light-measuring structure; a second objective capable of having its focal length adjusted and located in front of said photosensitive element so that the light reaches the latter through said second objective; a pair of adjusting means respectively connected operatively to said objectives for adjusting the focal lengths thereof; and coupling means coupling said pair of adjusting means to each other for simultaneous operation so that said second objective will be adjusted simultaneously with the camera objective, said pair of adjusting means and coupling means cooperating to automatically direct light through said second objective to said photosensitive element from a viewing angle which is identical with the viewing angle of the camera objective, said pair of adjusting means respectively including a pair of rotary elements and said coupling means including a parallelogram linkage having a pair of cranks respectively fixed to said pair of rotary elements for rotary movement therewith, said cranks being supported for rotary movement about axes which respectively coincide with the turning axes of said rotary elements.

4. In a camera, in combination, a camera objective capable of having its focal length adjusted; a photosensitive element forming part of a light-measuring structure; a second objective capable of having its focal length adjusted and located in front of said photosensitive element so that the light reaches the latter through said second objective; a pair of adjusting means respectively connected operatively to said objectives for adjusting the focal lengths thereof; and coupling means coupling said pair of adjusting means to each other for simultaneous operation so that said second objective will be adjusted simultaneously with the camera objective, said pair of adjusting means and coupling means cooperating to automatically direct light through said second objective to said photosensitive element from a viewing angle which is identical with the viewing angle of the camera objective, said pair of adjusting means respectively including a pair of rotary elements and said coupling means including a parallelogram linkage having a pair of cranks respectively fixed to said pair of rotary elements for rotary movement therewith, said cranks having the same length.

5. In a camera, in combination, a camera objective capable of having its focal length adjusted; a photosensitive element forming part of a light-measuring structure; a second objective capable of having its focal length adjusted and located in front of said photosensitive element so that the light reaches the latter through said second objective; a pair of adjusting means respectively connected operatively to said objectives for adjusting the focal lengths thereof; and coupling means coupling said pair of adjusting means to each other for simultaneous operation so that said second objective will be adjusted simultaneously with the camera objective, said pair of adjusting means respectively including a pair of movable elements and said coupling means including a linkage system including a pair of links respectively fixed to said pair of movable elements for movement therewith and cooperating for automatically directing light through said second objective to said photosensitive element from a viewing angle which is identical with the viewing angle of the camera objective, said second objective having lenses made of plastic material.

6. In a camera, in combination, a camera objective capable of having its focal length adjusted; a photosensitive element forming part of a light-measuring structure; a second objective capable of having its focal length adjusted and located in front of said photosensitive element so that the light reaches the latter through said second objective; a pair of adjusting means respectively connected operatively to said objectives for adjusting the focal lengths thereof; and coupling means coupling said pair of adjusting means to each other for simultaneous operation so that said second objective will be adjusted simultaneously with the camera objective, said pair of adjusting means respectively including a pair of movable elements and said coupling means including a linkage system including a pair of links respectively fixed to said pair of movable elements for movement therewith and cooperating for automatically directing light through said second objective to said photosensitive element from a viewing angle which is identical with the viewing angle of the camera objective, said second objective having nearest to said photosensitive element a lens whose face which is directed toward said photosensitive element is of a light-diffusing nature for evenly distributing the light over the photosensitive element.

References Cited by the Examiner
UNITED STATES PATENTS

| | | | |
|---|---|---|---|
| 2,064,341 | 12/36 | Deckel | 95—44 |
| 2,309,403 | 1/43 | Kosken | 95—44 |
| 2,518,718 | 8/50 | Rath | 95—44 |
| 2,521,093 | 9/50 | Rath | 95—10 |
| 2,959,092 | 11/60 | Faulhaber | 95—10 |
| 2,995,061 | 8/61 | Briskin | 95—45 X |
| 3,000,280 | 9/61 | Faulhaber | 95—10 |
| 3,002,422 | 10/61 | Lohmeyer | 95—45 X |

NORTON ANSHER, *Primary Examiner.*

D. B. LOWE, *Examiner.*